US012643289B2

(12) United States Patent (10) Patent No.: US 12,643,289 B2
Discekici et al. (45) Date of Patent: *Jun. 2, 2026

(54) FUSING AGENT COMPOSITIONS

(71) Applicant: PERIDOT PRINT LLC, Palo Alto, CA (US)

(72) Inventors: Emre Hiro Discekici, San Diego, CA (US); Emily Levin, San Diego, CA (US); Jake H. Thomas, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/714,996

(22) PCT Filed: Dec. 3, 2021

(86) PCT No.: PCT/US2021/061782

§ 371 (c)(1),
(2) Date: May 30, 2024

(87) PCT Pub. No.: WO2023/101683

PCT Pub. Date: Jun. 8, 2023

(65) Prior Publication Data

US 2025/0033275 A1 Jan. 30, 2025

(51) Int. Cl.
*B29C 64/165* (2017.01)
*B29C 64/153* (2017.01)
*B33Y 10/00* (2015.01)
*B33Y 70/10* (2020.01)

(52) U.S. Cl.
CPC .......... *B29C 64/165* (2017.08); *B29C 64/153* (2017.08); *B33Y 10/00* (2014.12); *B33Y 70/10* (2020.01)

(58) Field of Classification Search
CPC ... B29C 64/165; B29C 64/153; B29C 64/379; B33Y 10/00; B33Y 70/10; B33Y 70/00
See application file for complete search history.

(56) References Cited

U.S. PATENT DOCUMENTS

| | | | |
|---|---|---|---|
| 10,640,661 B2 | 5/2020 | Prasad et al. | |
| 12,552,096 B2* | 2/2026 | Wilson ................. | B29C 64/165 |
| 2008/0122141 A1 | 5/2008 | Bedal et al. | |
| 2018/0015663 A1* | 1/2018 | Zhao ..................... | B29C 64/165 |
| 2018/0272561 A1* | 9/2018 | Kasperchik ............ | B33Y 30/00 |

(Continued)

FOREIGN PATENT DOCUMENTS

| | | |
|---|---|---|
| CN | 110253785 A | 9/2019 |
| CN | 110267797 B | 7/2021 |

(Continued)

*Primary Examiner* — Nahida Sultana
(74) *Attorney, Agent, or Firm* — Dierker & Kavanaugh, P.C.

(57) ABSTRACT

Examples of the present disclosure are directed toward fusing agent compositions. An example fusing agent composition includes a radiation absorber, a co-solvent mixture, and a balance of water. In various examples, the radiation absorber is present in an amount ranging from about 0.005 weight percent (wt %) to about 1.0 wt % of a total weight of the fusing agent composition, wherein the radiation absorber absorbs radiation at a wavelength range within the visible light spectrum.

19 Claims, 8 Drawing Sheets

FUSING AGENT COMPOSITION 100

RADIATION ABSORBER 102

CO-SOLVENT MIXTURE 104

WATER 106

(56)                References Cited

U.S. PATENT DOCUMENTS

| 2018/0272607 A1* | 9/2018 | Chaffins ................. B28B 1/001 |
|---|---|---|
| 2019/0030788 A1* | 1/2019 | Erickson ................. B29C 67/00 |
| 2019/0382429 A1 | 12/2019 | Olubummo et al. |
| 2021/0107216 A1 | 4/2021 | Chaffins et al. |
| 2023/0398733 A1* | 12/2023 | Discekici .............. B29C 64/165 |
| 2024/0131782 A1* | 4/2024 | Rudisill ................ B29C 64/295 |
| 2024/0141203 A1* | 5/2024 | Discekici ............. C09D 177/04 |
| 2024/0269922 A1* | 8/2024 | Hartman .......... B29D 11/00923 |
| 2024/0286344 A1* | 8/2024 | Wycoff ................. B33Y 70/10 |

FOREIGN PATENT DOCUMENTS

| WO | 2017/194449 A1 | 11/2017 |
|---|---|---|
| WO | 2017/196364 A1 | 11/2017 |
| WO | 2017/200534 A1 | 11/2017 |
| WO | 2018/080631 A1 | 5/2018 |
| WO | 2019/117015 A1 | 6/2019 |
| WO | 2020/251520 A1 | 12/2020 |
| WO | 2021/118529 A1 | 6/2021 |

* cited by examiner

450

APPLYING A BUILD MATERIAL COMPOSITION TO FORM A BUILD MATERIAL LAYER    452

SELECTIVELY APPLYING A FUSING AGENT ON A PORTION OF THE BUILD MATERIAL LAYER    454

EXPOSING THE APPLIED FUSING AGENT COMPOSITION AND THE PORTION OF THE BUILD MATERIAL LAYER TO RADIATION AT A SECOND WAVELENGTH RANGE WITHIN THE VISIBLE LIGHT SPECTRUM    456

FUSING AGENT COMPOSITIONS

BACKGROUND

Three-dimensional (3D) printing is an additive printing process used to generate 3D objects from a digital model. 3D printing techniques are considered additive as the techniques involve the application of successive layers of material. This is unlike traditional machining processes, which may rely on the removal of material to create the final object. Some 3D printing processes involve curing or fusing material, which for some materials may be accomplished using heat-assisted extrusion or sintering, and for other materials may be accomplished using digital light projection technology.

DETAILED DESCRIPTION

Figure 1:
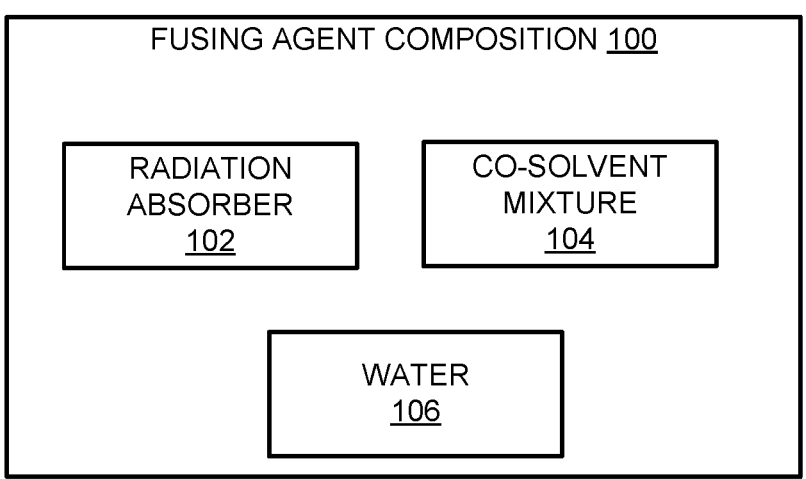
FIG. 1 illustrates an example fusing agent composition, consistent with the present disclosure.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An additive printing process may be used to generate 3D parts of a variety of different colors through the layering and solidification of a build material using a 3D printing system. The printing system is based on a 3D fabrication process involving the use of electromagnetic radiation (herein generally referred to as "radiation") for fusing a build material using a fusing agent to selectively define the 3D object or a part of the 3D object layer by layer. The fusing agent includes a radiation absorber and may be selectively applied by the printing system, such that the fusing agent is in contact with the build material at a selected portion. The fusing agent and the portion of the build material are exposed to the radiation to fuse the build material together. The radiation absorber may convert the radiation to thermal energy to melt the build material that is in contact with the radiation absorber and/or cause chemical bonding between particles of the build material. For example, the build material may fuse or coalesce to form a single entity, e.g., a layer of a 3D object. In some instances, a white or near-neutral white 3D part may be printed by using a fusing agent that includes tungsten bronze or other colorless ultra-violet (UV) radiation absorbers and/or an UV or Infrared (IR) light source.

Examples of the present disclosure are directed toward a fusing agent composition that includes a radiation absorber present in an amount less than 1.0 weight percent (wt %) of a total weight of the fusing agent composition and a vehicle for the radiation absorber. A fusing agent composition, as used herein, includes a composition that includes a radiation absorber and which may be used to fuse build material. The radiation absorber may be a visible-light absorbing colorant that absorbs radiation at a wavelength range within the visible light spectrum. The colorant is used as the radiation absorber and not to provide color. A radiation absorber, as used herein, includes or refers to a component that absorbs radiation and converts the absorbed radiation to thermal energy. The vehicle is an aqueous vehicle, and may include a co-solvent mixture and a balance of water. A co-solvent mixture, as used herein, includes or refers to a mixture of co-solvents, which may include at least one co-solvent having plasticizing characteristics when interacting with the build material and, optionally, additional co-solvent(s) to provide miscibility, jettability, and/or other characteristics. The co-solvent mixture may reduce a melting point of the build material, when the fusing agent composition comes in contact therewith, thus allowing for use of visible light to fuse the build material via the radiation absorber present in the amount less than 1.0 wt % of the total weight of the fusing agent composition.

As the radiation absorber is present in the amount less than 1.0 wt %, and with the use of a build material composition including a whitener, a white layer of a 3D part may be formed. Such examples may include forming the white layer of the 3D part without the use of a UV radiation absorber, such as tungsten bronze, and without the use of a UV light source, which may reduce the costs of producing the 3D part, increase selectivity and safety, and reduce build material degradation. White or white layer, as used herein, includes or refers to a neutral white color or a near neutral white color. That is, the white layer is not limited to neutral white, which may be referred to as a pure white.

To form the fusing agent composition, the radiation absorber may be incorporated into the vehicle, which includes the co-solvent mixture and water. A vehicle includes or refers to a liquid in which the radiation absorber is dispersed or dissolved in to form a fusing agent. The fusing agent composition may include other components, such as additives including buffers and biocides.

Referring now to the figures, FIG. 1 illustrates an example fusing agent composition, consistent with the present disclosure. The fusing agent composition 100 may be used to form white 3D parts without the use of UV or IR light and/or UV or IR radiation absorbers.

In various examples, the fusing agent composition 100 is aqueous based. The aqueous nature and particular components of the fusing agent composition 100 may enhance the wetting properties of the fusing agent composition 100. This may allow for the radiation absorber 102 within the fusing agent composition 100 to be spread uniformly over the build material surface.

The fusing agent composition 100 comprises a radiation absorber 102 present in an amount ranging from about 0.005 wt % to about 1.0 wt % of a total weight of the fusing agent composition 100. The radiation absorber 102 acts as an active material that absorbs radiation. More particularly, the radiation absorber 102 absorbs radiation at a wavelength range within the visible spectrum. For example, the radiation absorber 102 may include a visible-light absorbing colorant, such as a dye or a pigment having any color. Example colors include cyan, magenta, yellow, red, blue, and black, among others. Non-limiting example radiation absorbers include Direct Black (DB) 168, Acid Yellow (AY) 23, AY 17, Acid Red (AR) 52, AR 289, Reactive Red 180 (RR 180), Direct Blue (DB) 199, Pigment Blue (PB) 15:3, Pigment Red (PR) 122, Pigment Yellow (PY) 155, PY 74, and cesium tungsten oxide. In some examples, the radiation absorber 102 may include dye or pigment and sodium or potassium counter ions.

The radiation absorber 102 may include an absorbing colorant that absorbs radiation at the wavelength range between about 380 nanometers (nm) and about 780 nm, such as a sub-portion of the visible light spectrum which is between 380 nm and 780 nm. In some examples, the radiation absorber 102 absorbs radiation at a wavelength of greater than about 380 nm and less than about 700 nm, such as less than 650 nm, less than 600 nm, less than 590 nm, less than 580 nm, less than 550 nm, less than 500 nm, less than 450 nm, or less than 400 nm. For example, the radiation absorber 102 may include a colorant that reflects radiation at wavelengths of about 750 nm, 590 nm, 580 nm, 550 nm, 500 nm, 455 nm, 450 nm, or 380 nm, and absorbs other visible light wavelengths which may be lower than the reflected wavelength(s). As further described herein, the radiation absorber 102 may absorb at the wavelength range that includes and/or overlaps with a wavelength range of a light source (e.g., fusing lamp) used to fuse the build material.

In some examples, the radiation absorber 102 is present in an amount ranging from about 0.005 wt % to about 0.75 wt, about 0.005 wt % to about 0.60 wt %, about 0.005 wt % to about 0.55 wt %, about 0.005 wt % to about 0.50 wt %, about 0.005 wt % to about 0.45 wt %, about 0.005 wt % to about 0.40 wt %, about 0.005 wt % to about 0.35 wt %, about 0.005 wt % to about 0.30 wt %, about 0.005 wt % to about 0.25 wt %, about 0.005 wt % to about 0.20 wt %, about 0.005 wt % to about 0.15 wt %, about 0.005 wt % to about 0.10 wt %, about 0.005 wt % to about 0.05 wt %, about 0.01 wt % to about 0.75 wt %, about 0.01 wt % to about 0.50 wt %, about 0.01 wt % to about 0.25 wt %, about 0.05 wt % to about 0.75 wt %, about 0.05 wt % to about 0.50 wt %, about 0.05 wt % to about 0.25 wt %, about 0.1 wt %, to about 0.75 wt %, or about 0.1 wt %, to about 0.50 wt % of the total weight of the fusing agent composition 100, among other ranges of wt %. In some examples, the radiation absorber 102 is present in an amount of about 0.75 wt %, about 0.5 wt %, about 0.1 wt %, about 0.01 wt %, or about 0.005 wt % among other wt %.

The fusing agent composition 100 further comprises a co-solvent mixture 104 and a balance of water 106. The co-solvent mixture 104 may allow for the radiation absorber 102 to spread over the build material, when applied thereto, and/or penetrate into a layer of the build material. The co-solvents of the co-solvent mixture 104 may have a boiling point of greater than about 200° C. and/or provide vapor pressure that is sufficiently low to prevent flammability. Additionally, the co-solvents of the co-solvent mixture 104 may plasticize (e.g., has plasticizing characteristics) the build material when in contact therewith, such that the build material may fuse using the fusing agent composition 100 having the radiation absorber 102 at concentrations of about 1.0% or less. The co-solvent mixture 104 may include a first co-solvent and a second co-solvent, as further illustrated by FIG. 2. In some examples, the co-solvent mixture 104 is present in an amount ranging from about 20 wt % to about 80 wt % of the total weight of the fusing agent composition 100. In some examples, the co-solvent mixture 104 is present in an amount ranging from about 30 wt % to about 80 wt %, about 35 wt % to about 80 wt %, about 40 wt % to about 80 wt %, about 50 wt % to about 80 wt %, about 60 wt % to about 80 wt %, about 20 wt % to about 70 wt %, about 20 wt % to about 60 wt %, about 20 wt % to about 50 wt %, about 20 wt % to about 40 wt %, about 20 wt % to about 30 wt %, about 20 wt %, about 30 wt %, about 40 wt %, about 50 wt %, about 60 wt %, about 65 wt %, or about 66 wt %, among other wt % of the total weight of the fusing agent composition 100.

Various examples are directed to methods of forming the fusing agent composition 100 for 3D printing. The methods include mixing the radiation absorber 102 with the co-solvent mixture 104 and water 106. The mixing may be provided by a variety of sources, such as a mixer. Example mixers include an industrial paddle mixer, a high shear mixer, a resonant acoustic mixer, and a jet mills, among others. In some examples, a mixer mill may be used such as a ball mill or power mill. In some examples, the mixing may be performed in the 3D printer or separately therefrom.

Figure 2:
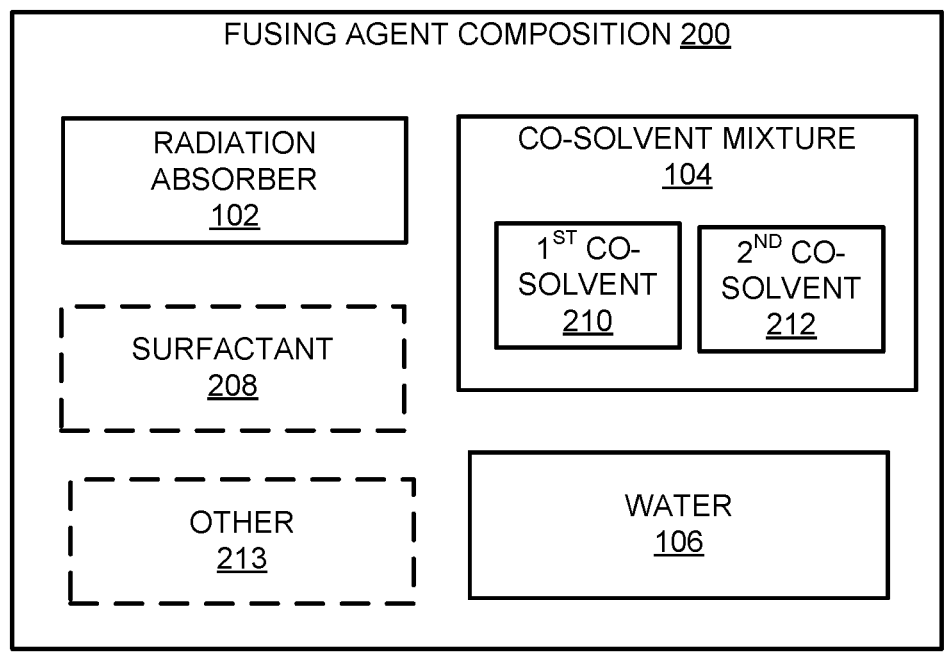
FIG. 2 illustrates another example fusing agent composition, consistent with the present disclosure.

FIG. 2 illustrates another example fusing agent composition, consistent with the present disclosure. The fusing agent composition 200 of FIG. 2 may include at least substantially the same components as the fusing agent composition 100 of FIG. 1, including a radiation absorber 102, a co-solvent mixture 104, and a balance of water 106. As shown by FIG. 2, the co-solvent mixture 104 includes a first co-solvent 210 and a second co-solvent 212.

The first co-solvent 210 may provide miscibility to the fusing agent composition 200. For example, the first co-solvent 210 may provide miscibility for the second co-solvent 212 with water. Examples of the first co-solvent 210 include 1-(2-Hydroxyethyl)-2-pyrrolidone (HE2P), 1,5-Pentanediol, 1,2-Hexanediol, 2-Pyrrolidinone, Triethylene glycol, Tetraethylene glycol, 2-methyl-1,3-propanediol, 1,6-Hexanediol, and Tripropylene glycol methyl ether, propylene glycol (1,2-propanediol), and diethylene glycol butyl either, among other organic co-solvents.

The second co-solvent 212 may provide a reduction in a melting point of a build material when the fusing agent composition 200 comes in contact therewith. For example, the second co-solvent 212 may be a plasticizer and/or have plasticizing characteristics when interacting with the build material. In some examples, the second co-solvent 212 includes benzyl alcohol or diethylene glycol butyl ether, among other organic co-solvents. A plasticizer includes or refers to a compound that increases plasticity of a material, such as increasing flexibility of polymers by decreasing attraction between polymer chains. Plasticizing characteristics include or refer to flexibility, plasticity, viscosity, and/or friction during handling in manufacture. For example, the second co-solvent 212 may increase flexibility and/or increase plasticity of the build material.

In some examples, the first co-solvent 210 is present in an amount ranging from about 10 wt % to about 50 wt % of the total weight of the fusing agent composition 200 and the second co-solvent 212 is present in an amount ranging from about 10 wt % to about 35 wt % of the total weight of the fusing agent composition 200. In some examples, the first co-solvent 210 is present in an amount ranging from about 15 wt % to about 50 wt %, about 20 wt % to about 50 wt %, about 25 wt % to about 50 wt %, about 30 wt % to about 50 wt %, about 40 wt % to about 50 wt %, about 15 wt % to about 40 wt %, or about 15 wt % to about 36 wt %. In some examples, the second co-solvent 212 is present in an amount ranging from about 15 wt % to about 35 wt %, about 20 wt % to about 35 wt %, about 25 wt % to about 35 wt %, about 30 wt % to about 35 wt %, about 10 wt % to about 30 wt %, or about 15 wt % to about 30 wt %.

In various examples, the fusing agent composition 200 further includes a surfactant 208. The surfactant 208 may improve jettability of the fusing agent composition 200 and/or allow for the fusing agent composition 200 to spread uniformly and penetrate into a build material layer when applied. In some examples, the surfactant 208 may be present in an amount ranging from about 0.5 wt % to about 1.0 wt % of the total weight of the fusing agent composition 200. Non-limiting example surfactants include a secondary alcohol ethoxylate, such as Tergitol™15-S-9, or other water-soluable non-ionic surfactants.

The fusing agent composition 200 may further include other component(s) 213. The other component(s) 213 may include an additive such as a buffer and/or a biocide. In some examples, the total amount of biocide(s) in the fusing agent composition 200 ranges from about 0 wt % to about 0.95 wt %. Example biocides include NUOSEPT® (Ashland Inc.), UCARCIDE™ and KORDEK™ and ROCIMA™ (Dow Chemical Co.), PROXEL® (Arch Chemicals) series, ACTI-CIDE® B20 and ACTICIDE® M20 and ACTICIDE® MBL (blends of 2-methyl-4-isothiazolin-3-one (MIT), 1,2-ben-zisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.).

Figure 3:
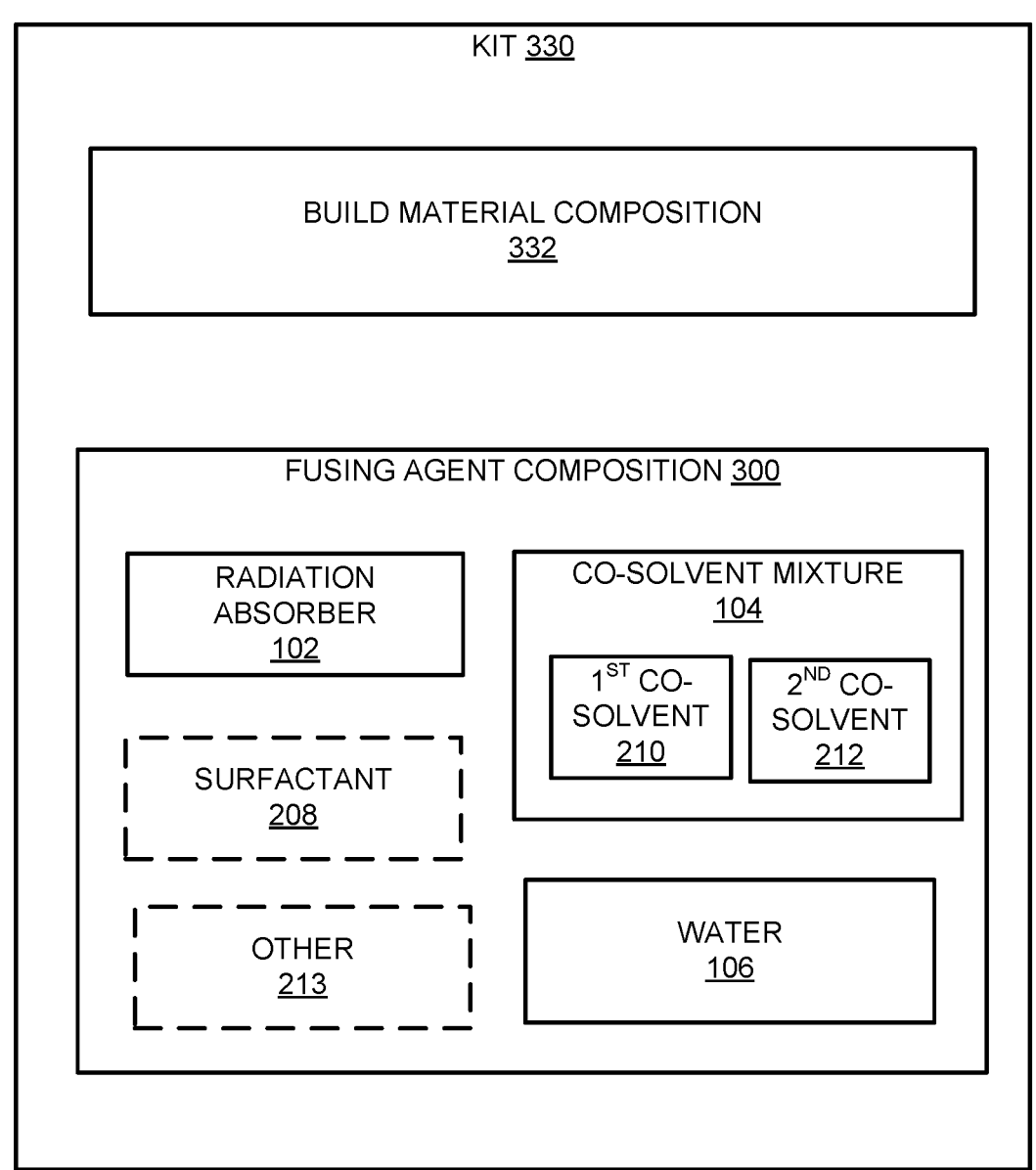
FIG. 3 illustrates an example kit comprising a fusing agent composition, consistent with the present disclosure.

FIG. 3 illustrates an example kit comprising a fusing agent composition, consistent with the present disclosure. The kit 330 comprises a build material composition 332 and the fusing agent composition 300.

As used herein, a build material composition includes or refers to a composition including a build material, which may be fused to generate a 3D object. The build material composition 332 may include a build material filled with a whitener. The whitener may include zinc oxide or TiO2, among other whitener fillers. Other example whiteners include calcium carbonate, zirconium dioxide ($ZrO_2$), aluminum oxide ($Al_2O_3$), silicon dioxide ($SiO_2$), and combinations of the example whiteners. The build material may be a powder, a liquid, a paste, or a gel, such as a powder polymer. Example build materials include polyamides, modified polyamides, polyethylene, polyethylene terephthalate (PET), and amorphous variations of these materials. Other example build materials include polystyrene, polyacetals, polypropylene, polycarbonate, polyester, polyurethanes, other engineering plastics, and blends of any two or more of the polymers listed herein. Core shell polymer particles of these materials may also be used. In some examples, the build material may have a melting point ranging from about 55 degrees Celsius (° C.) to about 450° C., and the second co-solvent 212 may reduce the melting point of the build material.

In some examples, the build material composition 332 may include a whitener present in an amount ranging from about 0.5 wt % to about 5.0 wt % of the total weight of the build material composition 332 and/or as proportional weight percent of the build material, such as a polymer. In some examples, the second co whitener is present in an amount ranging from about 0.5 wt % to about 4.5 wt %, about 0.5 wt % to about 4.0 wt %, about 0.5 wt % to about 3.5 wt %, about 0.5 wt % to about 3.0 wt %, about 0.5 wt % to about 2.5 wt %, about 0.5 wt % to about 2.0 wt %, about 0.5 wt % to about 1.5 wt %, about 0.5 wt % to about 1.0 wt %, about 1.0 wt % to about 5.0 wt %, about 1.5 wt % to about 5.0 wt %, about 2.0 wt % to about 5.0 wt %, about 2.5 wt % to about 5.0 wt %, about 3.0 wt % to about 5.0 wt %, about 3.5 wt % to about 5.0 wt %, about 4.0 wt % to about 5.0 wt %, or about 4.5 wt % to about 5.0 wt %, among other ranges.

When the build material is in powder form, the build material may be made up of similarly sized particles or differently sized particles. Size, as used herein, refers to the diameter of a spherical particle, or the average diameter of a non-spherical particle. In some examples, the average size of the particles of the build material in the build material composition 332 ranges from about 10 micrometer (μm) to about 100 μm or about 40 μm to about 50 μm. In some examples, the diameter or average diameter of the particles may be measured using an analytical chemical analysis. For example, the average diameter of the particles are measured using a volume, based size distribution. The size of the particles may be measured by using a static light scattering technique, such as laser diffraction.

The build material composition 332 may further include other components such as a charging agent and/or a flow aid. Charging agent(s) may be added to suppress tribo-charging. Example charging agents include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some commercially available charging agents include HOSTASTAT® FA 38 (natural based ethoxylated alkylamine), HOSTASTAT® FE2 (fatty acid ester), and HOSTASTAT® HS 1 (alkane sulfonate), available from Clariant Int. Ltd.). In some examples, the charging agent is added in an amount ranging from greater than about 0 wt % to less than about 5 wt % of the total weight of the build material composition 332.

Flow aid(s) may be added to improve the coating flowability of the build material composition 332. The flow aid may improve the flowability of the build material composition 332 by reducing the friction, the lateral drag, and the tribocharge buildup (by increasing the particle conductivity). Examples flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In some examples, the flow aid is added in an amount ranging from greater than about 0 wt % to less than about 5 wt % based upon the total weight of the build material composition 332.

The fusing agent composition 300 may include substantially the same components as the fusing agent composition 100 of FIG. 1, including the radiation absorber 102, the first co-solvent 210 and the second co-solvent 212, which may form the co-solvent mixture 104, and a balance of water 106. The radiation absorber 102 may be present in an amount ranging from about 0.005 wt % to about 1.0 wt % and may absorb radiation at a wavelength range within the visible spectrum, as previously described. In some examples, the radiation absorber 102 is a visible-light absorbing colorant selected from a pigment and a dye, and is to absorb the radiation at the wavelength range and convert the radiation to thermal energy. The first co-solvent 210 and the second co-solvent 212 together may be in an amount ranging from about 20 wt % to about 80 wt % of the total weight of the fusing agent composition 300.

The kit 330 may be used to provide additive 3D printing. As noted above, 3D printing systems may generate 3D objects based on structural design data. This may involve a designer generating a 3D model of an object to be generated, for example using a computer aided design (CAD) application. The model may define the solid portions of the object.

An additive 3D printing process may be performed in several stages using a 3D printing system. In a build material depositing stage, a layer of build material composition 332 (e.g., powder) is deposited onto a build platform of a 3D printing system. In the fusing agent depositing stage, the fusing agent composition 300 is distributed onto the layer of build material composition 332. For example, the fusing agent composition 300 is deposited at positions where it is intended for the build material to be bound together. Thermal energy is applied to increase the temperature of build material composition 332 and to cause particles of the build materiel to bind together. This stage may be referred to as a curing stage, a curing process or an annealing process/stage. For example, curing may be achieved by increasing the amount of thermal energy provided in the fabrication chamber. Following the curing process, the build material becomes bound or solidified.

In some examples, the build material composition 332 and fusing agent composition 300 may be applied at different ratios with respect to one another. For example, for a contone (ct) range of 5-100 ct, the total fusing agent weight fraction relative to build material composition 332 (e.g., powder) is 1%-18%. Contone range, sometimes referred to as a continuous tone image range, as used herein, refers to and/or includes a range of tones on a scale from white to black.

Figure 4:
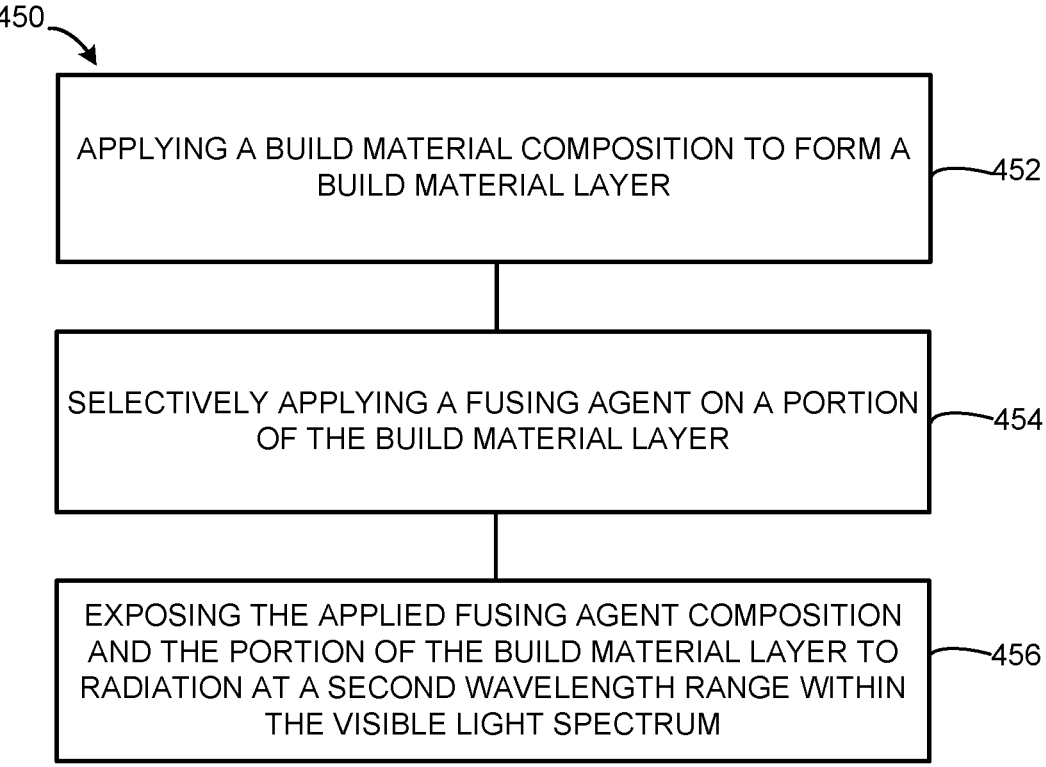
FIG. 4 illustrates an example method of forming a 3D part using a fusing agent composition, consistent with the present disclosure.

FIG. 4 illustrates an example method of forming a 3D part using a fusing agent composition, consistent with the present disclosure. The method 450 may be implemented by a 3D printing apparatus and using any of the example fusing agent compositions 100, 200 and/or kit 330 as illustrated by FIGS. 1-3.

At 452, the method 450 includes applying a build material composition to form a build material layer. The application may be based on a 3D model.

At 454, the method 450 includes selectively applying a fusing agent composition on a portion of the build material layer. The fusing agent composition comprises the radiation absorber present in the amount ranging from about 0.005 wt % to about 1.0 wt % of a total weight of the fusing agent composition, a co-solvent mixture present in an amount ranging from about 20 wt % to about 80 wt % of the total weight of the fusing agent composition, and a balance of water. The radiation absorber absorbs radiation at a first wavelength range within the visible light spectrum and the co-solvent mixture includes a first co-solvent and a second co-solvent.

At 456, the method 450 includes exposing the applied fusing agent composition and the portion of the build material layer to radiation at a second wavelength range within the visible light spectrum to fuse the portion of the build material layer and to form a white layer of a 3D part. The 3D part may include a layer of a portion of or a layer of the whole 3D object.

Exposing the applied fusing agent composition and the portion of the build material layer to the radiation may include using a visible light-light source that emits the radiation of the second wavelength range which overlaps with the first wavelength range. The visible light-light source may include a light emitting diode (LED) or other light source that emits light in the visible light spectrum. In some examples, the visible light-light source may emit 455 nm, 565 nm, 590 nm, 605 nm, or 625 nm light, among other wavelength ranges within the visible light spectrum. In some examples, in response to exposing the applied fusing agent composition to the radiation of the second wavelength range, the method 450 may comprise absorbing the radiation of the second wavelength range that overlaps with the first wavelength range and converting the radiation to thermal energy by the radiation absorber, and in response to the thermal energy, melting and fusing the build material layer, wherein a melting point of the build material composition is reduced by the second co-solvent.

The white layer may include a neutral white color or a near neutral white color. For example, the white layer of the 3D part may have coordinates of lightness (L*), red/green (a*), and yellow/blue (b*) in amounts ranging from about 80 L* to about 100 L*, about −3 a* to about 3 a*, and about −5 b* to about 5 b*. A near neutral white, as used herein, includes or refers to a color that appears to be a neutral white but that is not a neutral white, such as an off-white, a tan, an ivory, among others.

In some examples, the resulting white layer of the 3D part may include the radiation absorber present in an amount ranging from about 0.0005 wt % to about 0.01 wt % of a total weight of the white layer of the 3D part. In some examples, the radiation absorber present in an amount ranging from about 0.0005 wt % to about 0.05 wt %, about 0.0005 wt % to about 0.01 wt %, about 0.0005 wt % to about 0.001 wt %, about 0.0005 wt % to about 0.001 wt %, about 0.001 wt % to about 0.01 wt %, or about 0.05 wt % to about 0.01 wt %, among other ranges.

FIGS. 5A-5E illustrate a cross-sectional view of an example 3D printing system forming a layer of a part of a 3D object, consistent with the present disclosure. The 3D printing system 560 includes a supply bed 566 (including a supply of the build material composition 562), a delivery piston 568, a roller 570, a fabrication bed 572 (having a contact surface 573), and a fabrication piston 574. The components may be operatively connected to processor circuitry, such as a central processing unit (CPU) (not shown) of the printing system 560. The processor circuitry (e.g., running computer readable instructions stored on a non-transitory, tangible computer readable storage medium) manipulates and transforms data to control the components and to create a part of the 3D object. The data for the selective delivery of the build material composition and the fusing agent composition may be derived from a model of the 3D object.

The delivery piston 568 and the fabrication piston 574 may be the same type of piston, and are programmed to move in opposite directions. In some examples, to form a first layer of the 3D object, the delivery piston 568 may be programmed to push a predetermined amount of the build material composition 562 out of an opening in the supply bed 566, and the fabrication piston 574 may be programmed to move in the opposite direction of the delivery piston 568 to increase the depth of the fabrication bed 572. The delivery piston 568 may advance enough so that when the roller 570 pushes the build material composition 562 into the fabrication bed 572 and onto the contact surface 573, the depth of the fabrication bed 572 is sufficient so that a layer 564 of the build material composition 562 may be formed in the bed 572. The roller 570 is capable of spreading the build material composition 562 into the fabrication bed 572 to form the layer 564, which is relatively uniform in thickness.

In some examples, the roller 570 may be replaced by other tools, such as a blade for spreading different types of powders, or a combination of a roller and a blade. In some examples, the printing system 560 may not include a supply bed 566 and may include other delivery systems to supply the build material composition 562 to the fabrication bed 572, such as a trough, a hopper, an auger conveyer, among others. For example, the printing system 560 may include a trough with the supply of the build material composition 562 which the roller 570 (or other spreader) may push the build material composition 562 from and into the fabrication bed 572.

Figures 5A, 5B, 5C, 5D:
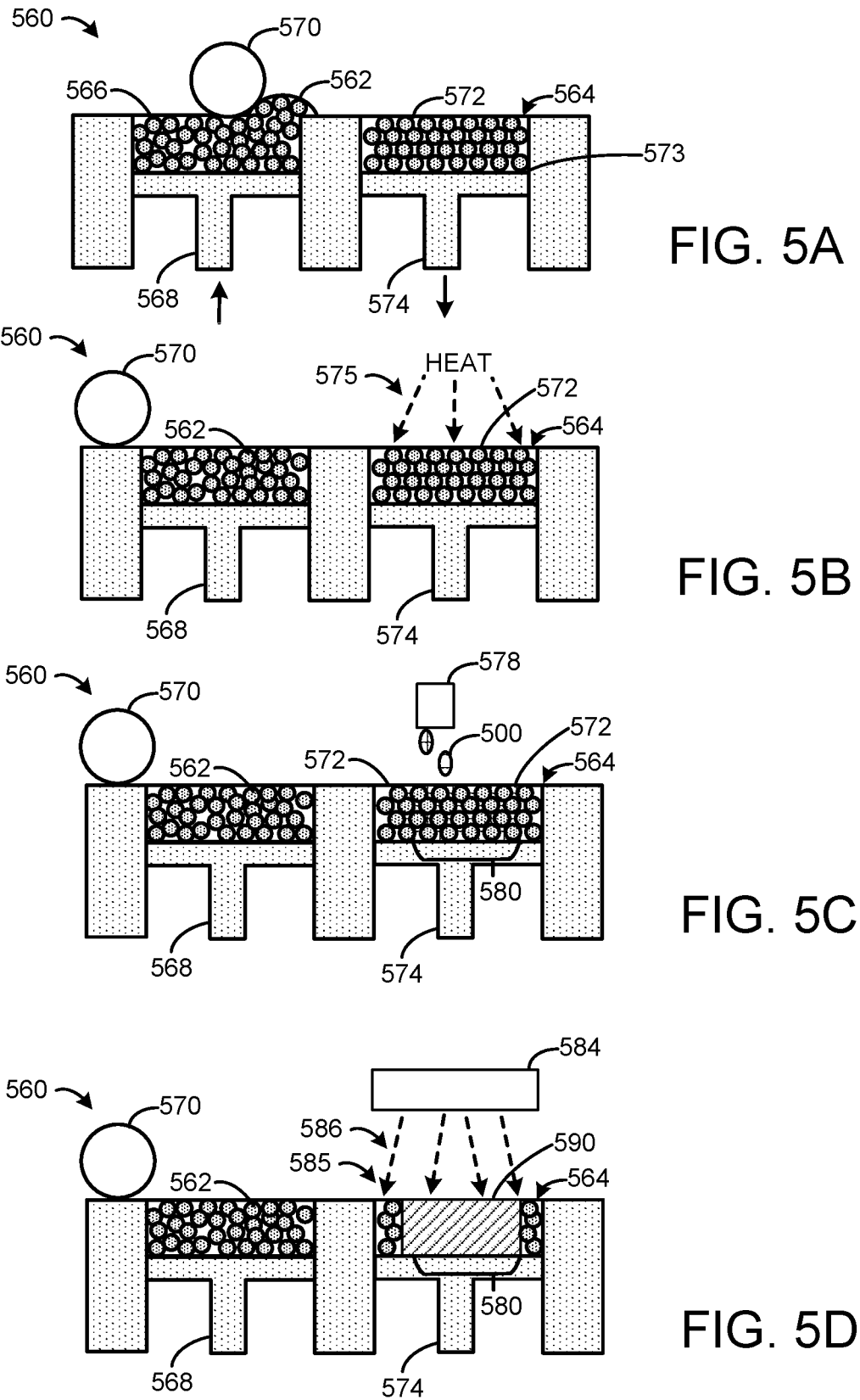
FIGS. 5A-5E illustrate a cross-sectional view of a 3D printing system forming a layer of a part of a 3D object, consistent with the present disclosure.

After the layer 564 of the build material composition 562 is introduced into the fabrication bed 572, the layer 564 is exposed to heating, as shown at 575 of FIG. 5B. Heating is performed to pre-heat the build material composition 562, such as to a heating temperature below the melting point of the build material composition 562. As such, the heating temperature selected depends upon the build material that is used. As examples, the heating temperature may be from about 5° C. to about 20° C. below the melting point of the build material composition 562. In some examples, the build material composition 562 is heated to a temperature ranging from about 50° C. to about 430° C., about 50° C. to about 400° C., 50° C. to about 350° C., about 50° C. to about 300° C., about 50° C. to about 250° C., about 50° C. to about 200° C., about 50° C. to about 150° C., about 50° C. to about 100° C., about 100° C. to about 430° C., about 150° C. to about 430° C., about 200° C. to about 430° C., about 250° C. to about 430° C., about 300° C. to about 430° C., or about 350° C. to about 430° C., among other ranges.

The build material composition 562 in the layer 564 may be pre-heated using a heat source that exposes the build material composition 562 in the fabrication bed 572 to the heat. Example heat sources include an electromagnetic radiation source, such as an IR or near-IR light source.

After pre-heating the layer 564, the previously described fusing agent composition 500 is selectively applied on a portion 580 of the build material composition 562 in the layer 564, as shown by FIG. 5C. The fusing agent composition 500 may be dispensed from an inkjet applicator 578 (e.g., a thermal inkjet or a piezoelectric inkjet printhead). While a single inkjet applicator 578 is shown in FIG. 5C, multiple inkjet applicators may be used that span the width of the fabrication bed 572. The inkjet applicator(s) 578 may be attached to a moving XY stage or a translational carriage (not shown) that moves the inkjet applicator(s) 578 adjacent to the fabrication bed 572 to deposit the fusing agent composition 500 to target portion(s) (e.g., portion 580) of the layer 564.

The inkjet applicator(s) 578 may be programmed to receive commands from processor circuitry and to deposit the fusing agent composition 500 according to a pattern of a cross-section for the layer of the part of (or the whole) 3D object to be formed. The cross-section of the layer of the part of or of the 3D object to be formed includes or refers to the cross-section that is parallel to the contact surface 573 as illustrated by FIG. 5A. The inkjet applicator(s) 578 selectively applies the fusing agent composition 500 on portions of the layer 564 that are to be fused to become a layer of the 3D object.

After the fusing agent composition 500 is selectively applied in the target portion(s) 580, the layer 564 of the build material composition 562 and the fusing agent composition 500 are exposed to radiation 586 as shown by FIG. 5D. As previously described, the radiation 586 is within the visible light spectrum. For example, a light source 584 that emits visible light, herein referred to as a visible light-light source, may be used. The light source 584 may include visible light LEDs, lamps, among other light sources. The light source 584 may be attached to a carriage that also holds the inkjet applicator(s) 578. The carriage may move the light source 584 into a position that is adjacent to the fabrication bed 572. The light source 584 may be programmed to receive commands from processor circuitry and to expose the layer 564 and applied fusing agent composition 500 to the radiation 586 (e.g., visible light energy).

The length of time the radiation 586 is applied for, or the energy exposure time, may be dependent on characteristics of the light source 584, characteristics of the build material composition 562, and/or characteristics of the fusing agent composition 500.

The fusing agent composition 500 converts the absorbed radiation to thermal energy, and promotes the transfer of the thermal energy (e.g., heat) to the build material composition 562 in contact with the fusing agent composition 500 (e.g., in the portion(s) 580). The fusing agent composition 500 may elevate the temperature of the build material composition 562 in the portions(s) 580 near or above its melting point, allowing fusing (which may include melting, sintering, binding) of the build material to take place. In some examples, the fusing agent composition 500 may cause heating of the build material composition 562 to below its melting point but to a temperature suitable to cause softening and bonding. The portion(s) not having the fusing agent composition 500 applied thereto, such as the portion 585, absorb less energy, and the build material composition 562 within these portion(s) 585 generally do not exceed the melting point and do not fuse. This forms one layer 590 of a part of the 3D object 591 (FIG. 5E) to be formed.

Figures 5E, 6:
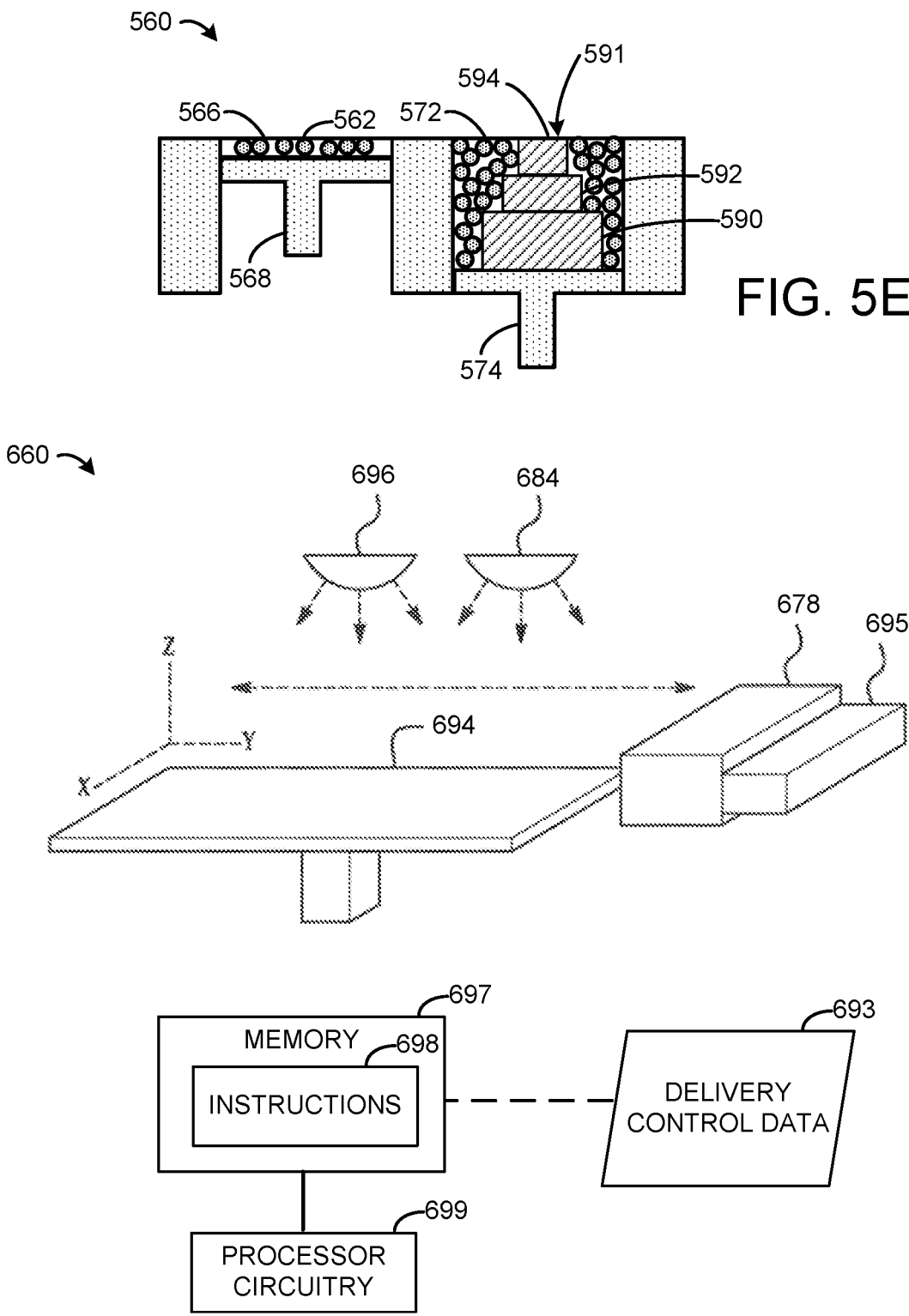
FIG. 6 illustrates an example of a 3D printing system, consistent with the present disclosure.

The above may be repeated to create subsequent layers 592, 594 as illustrated by FIG. 5E and to form the 3D object 591. Heat absorbed by a portion of the build material composition 562 on which fusing agent composition 500 is applied to or has penetrated may propagate to a previously solidified layer, such as layer 590, causing at least some of that layer 590 to heat up above its melting point. This effect may create interlayer bonding between adjacent layers (e.g., 590 and 592) of portions of the 3D object 591.

FIG. 5E illustrates an example 3D object 591 formed in the fabrication bed 572. Objects, parts of objects, and layers thereof may be a variety of sizes and shapes, and are not limited to that illustrated by FIG. 5E.

As illustrated by FIG. 5E, as layers 590, 592, 594 are formed, the delivery piston 568 is pushed closer to the opening of the supply bed 566, and the supply of the build material composition 562 in the supply bed 566 is diminished (compared to FIG. 5A). The fabrication piston 574 is pushed further away from the opening of the fabrication bed 572 for the subsequent layer(s) of build material composition 562 and the fusing agent composition 500. At least some of the build material composition 562 may remain unfused after each layer 590, 592, 594 is formed, and the 3D object 591 may be partially surrounded by the unfused build material. When the 3D object 591 is complete, it may be removed from the fabrication bed 572, and the unfused build material in the fabrication bed 572 may be reused depending on process conditions.

FIG. 6 illustrates an example of a 3D printing system, consistent with the present disclosure. The system 660 includes processor circuitry 699 that controls the operation of the 3D printing system 660. The processor circuitry 699 may be a CPU and/or a microprocessor-based controller coupled to a memory 697. The memory 697 stores the computer readable instructions 698. The processor circuitry 699 may execute the instructions 698, and control operation of the system 660 in accordance with the instructions 698.

In some examples, the 3D printing system 660 includes the inkjet applicator 678 to selectively apply a fusing agent composition to a layer of build material composition (as shown by FIGS. 5A-5E) provided on a support member 694. The support member 694 may include the fabrication bed 572 of FIG. 5A. The processor circuitry 699 may control the selective delivery of the fusing agent composition based on delivery control data 693.

In some examples, the inkjet applicator 678 may be a printhead, such as a thermal inkjet printhead or a piezoelectric inkjet printhead. The inkjet applicator 678 may be a drop-on-demand printhead or a continuous drop printhead. The inkjet applicator 678 may selectively deliver the fusing agent composition.

The inkjet applicator 678 may include an array of nozzles through which drops of fluid are selectively ejected. In some examples, each drop may be in the order of about 10 pico liters (pl) per drop, although a higher or lower drop size may be used. In some examples, the inkjet applicator 678 may deliver variable size drops. The inkjet applicator 678 may be an integral part of the 3D printing system 660 or it may be user replaceable.

While not shown, the inkjet applicator 678 may be mounted on a moveable carriage to move bi-directionally across the length of the support member 694 along the illustrated Y-axis. This allows for selective delivery of the fusing agent composition across the whole width and length of the support member 694 in a single pass. In other examples, the inkjet applicator 678 may be fixed and the support member 694 moves relative thereto.

As used herein, width generally denotes the shortest dimension in the plane parallel to the X and Y axes shown in FIG. 6, and length denotes the longest dimension in this plane. In some examples, width may be interchangeable with length. For example, the inkjet applicator 678 may have a length that spans the length of the support member 694 while the moveable carriage may move bi-directionally across the width of the support member 694.

In examples in which the inkjet applicator 678 has a length that does not allow it to span the whole width of the support member 694, the inkjet applicator 678 may be movable bi-directionally across the width of the support member 694 in the illustrated X axis. This allows for selective delivery of the fusing agent composition across the width and length of the support member 694 using multiple passes.

The inkjet applicator 578 may include therein a supply of the fusing agent composition, or may be operatively connected to a separate supply of the fusing agent composition.

The printing system 660 may include a build material distributor 695. The distributor 695 is used to provide the layer (e.g., layer 564 of FIG. 5A) of the build material composition on the support member 694. Example build material distributors 695 include a wiper blade, a roller, or combinations thereof.

The build material composition may be supplied to the build material distributor 695 from a hopper or other suitable delivery system. In the example shown, the build material distributor 695 moves across the length (Y axis) of the support member 694 to deposit a layer of the build material composition. As described above, a first layer of build material composition may be deposited on the support member 694, and subsequent layers of the build material composition may be deposited on a previously deposited (and solidified) layer.

The support member 694 may be moveable along the Z axis. In some examples, the support member 694 is moved in the Z direction such that as layers of build material composition are deposited, a predetermined gap is maintained between the surface of the most recently added layer and the lower surface of the inkjet applicator 678. In other examples, the support member 694 may be fixed along the Z axis, and the inkjet applicator 678 is movable along the Z axis.

As with system 560, the system 660 includes the light source 684 to apply radiation to the layer of build material composition and the selectively applied fusing agent composition to cause the solidification of portion(s) of the build material composition. In some examples, the light source 684 is a single source that applies energy to the applied materials, and in other examples, the light source 684 includes an array of energy sources. While not shown, the light source 684 may be mounted on the moveable carriage or may be in a fixed position. The processor circuitry 699 may control the light source 684 and the amount of energy applied may be in accordance with delivery control data 693.

The system 660 may further include a pre-heater 696 that is used to pre-heat the deposited build material composition (as shown and described in reference to FIG. 5B). The use of the pre-heater 696 may reduce the amount of energy to be applied by the light source 684.

The various ranges provided herein include the stated range and any value or sub-range within the stated range. Furthermore, when "about" is utilized to describe a value, this includes, refers to, and/or encompasses variations (up to +/−10%) from the stated value. Wt %, as used herein, includes or refers to a weight of a component as a percent of the total weight of the composition or solution.

Reference throughout the specification to "examples", "an example", "some examples", and so forth, means that a particular element (e.g., feature, structure, and/or characteristic) described in connection with the example is included in the example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

EXAMPLES

The following illustrates examples of fusing agent compositions, building materials compositions, and related aspects described in the present disclosure. These examples should not be considered to restrict the present disclosure, but are merely in place to teach how to make examples of fusing agent compositions of the present disclosure.

Various experiments were directed to generating fusing agent compositions and printing white and/or near neutral white 3D parts using the generated fusing agent compositions without the use of UV fusing lamps and/or UV light absorbers.

In some experiments, the visible light color absorber of AY 23 was used as the radiation absorber, and was present in amounts of 0.75 wt % and 0.05 wt % of the total weight of the fusing agent compositions. The example fusing agent compositions further included a co-solvent mixture of HE2P and benzyl alcohol, with a surfactant of Tergitol 15-S-9 and a balance of water. Table 1 and Table 2 below provide the formulations of the fusing agent compositions:

TABLE 1

| Fusing Agent Composition A | |
| --- | --- |
| Fusing Agent Composition A Components | Wt % |
| HE2P | 50 |
| Benzyl Alcohol | 16 |
| AY 23 | 0.75 |
| Tergitol 15-S-9 | 0.8 |
| Deionized Water | 32.45 |

TABLE 2

| Fusing Agent Composition B | |
| --- | --- |
| Fusing Agent Composition B Components | Wt % |
| HE2P | 50 |
| Benzyl Alcohol | 16 |
| AY 23 | 0.05 |
| Tergitol 15-S-9 | 0.8 |
| Deionized Water | 33.15 |

In other experiments, DB 168 or AY 23 was used as the radiation absorber with a co-solvent mixture of 1,2 Hexanediol and benzyl alcohol, with a surfactant of Tergitol 15-S-9 and a balance of water. In the experiments, ammonium nitrate was added to the fusing agent composition including DB 168 to assist with reduced printing of a brown color, however, examples are not so limited. Table 3 below provides the formulations of the fusing agent compositions:

TABLE 3

| Fusing Agent Compositions C and D | | |
| --- | --- | --- |
| Fusing Agent Composition Components | Composition C Wt % | Composition D Wt % |
| 1,2 Hexanediol | 36 | 36 |
| Benzyl Alcohol | 30 | 30 |
| AY 23 | 0.1 | — |
| DB 168 Na | — | 0.1 |
| Ammonium nitrate | — | 0.05 |
| Tergitol 15-S-9 | 0.8 | 0.8 |
| Deionized Water | 33.1 | 32.15 |
| Total grams (g) | 100 g | 100 g |

Several two-dimensional (2D) print tests were performed to show that the fusing agent compositions had reliable jetting performance.

Figure 7:
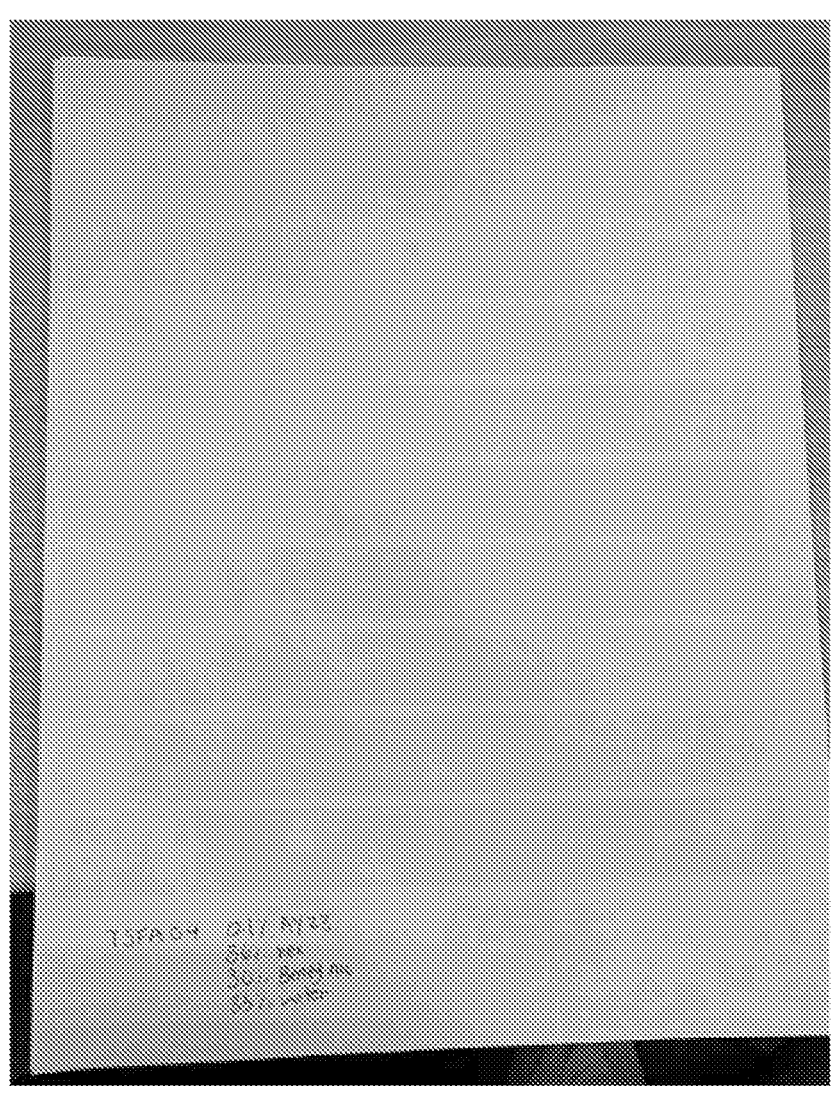
FIG. 7 illustrates experimental printing using a fusing agent composition, consistent with the present disclosure.

FIG. 7 illustrates experimental printing using a fusing agent composition, consistent with the present disclosure.

More particularly, fusing agent composition C, as shown in Table 3, was printed in a 2D printing device and illustrated reliable printing.

Some experiments were conducted to show offline fusing agent and build material (e.g., powder) compatibility. Such experiments were conducted to show the amount of radiation absorbers in the compositions were sufficiently low to be masked when used with the filled-whitener build material of Nylon Polyamide CB-PA12.

Figure 8:
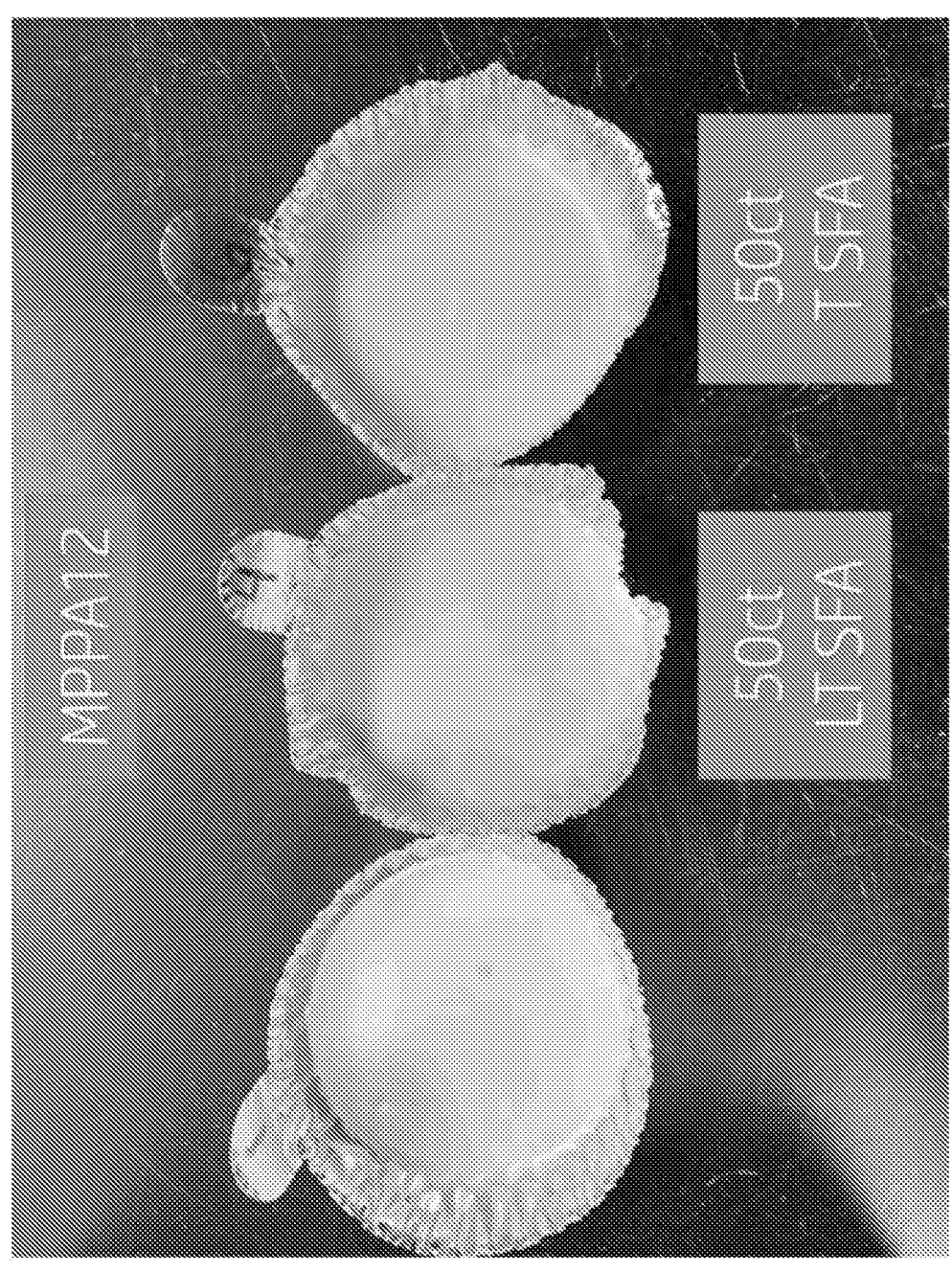
FIG. 8 illustrates experimental fusing agent compositions and compatibility with a build material, consistent with the present disclosure.

FIG. 8 illustrates experimental fusing agent compositions and compatibility with a build material, consistent with the present disclosure. In such experiments, the build material was CB-PA12 and fusing agent compositions A (far right side) and B (middle) were used, as shown in Tables 1-2 above. As shown by FIG. 8, dye loadings of 0.75% were sufficiently masked at representative fusion agent loadings, such that the resulting off-white color matches that of the control with no agent (far left side). In such examples, the build material included PA12 with titanium dioxide (e.g., $TiO_2$ used as the whitener) present between about 0.5 wt % and about 5.0 percent wt % of the total weight of the build material. The resulting 3D parts included a radiation absorber present between about 0.0005 wt % and about 0.1 wt %.

Some experiments were directed to evaluating the fusing agent compositions on a 3D testbed and 3D printers using visible-light LED light.

Figure 9A:
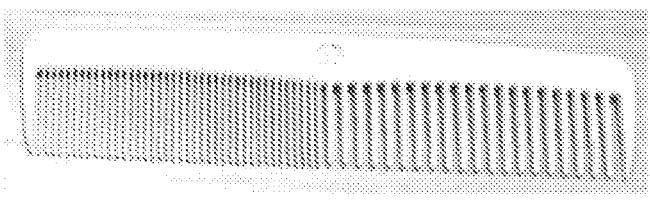
FIGS. 9A-9B illustrate 3D parts experimentally printed using a build material composition and a fusing agent composition, consistent with the present disclosure.
Figure 9B:
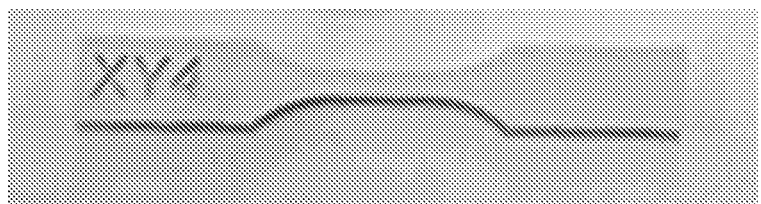

FIGS. 9A-9B illustrate 3D parts experimentally printed using a build material composition and a fusing agent composition, consistent with the present disclosure. FIG. 9A illustrates a resulting 3D part printed using a 3D printer, the build material CB-PA12, the fusing agent composition A, and fusing using 455 nm LEDs. The resulting 3D was pale-yellow or off-white which was achieved using the 0.75% dying load. FIG. 9B illustrates a resulting 3D part printed using a 3D printer, the build material CB-PA12, the fusing agent composition D, and fusing using 455 nm LEDs. The resulting 3D part in FIG. 9B had coordinates of L*=86.1, a*=−1.6, and b*=0.49.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A jettable fusing agent composition, comprising:
 a radiation absorber present in an amount ranging from about 0.005 weight percent (wt %) to about 1.0 wt % of a total weight of the fusing agent composition, wherein the radiation absorber absorbs radiation at a wavelength range within the visible light spectrum;
 a co-solvent mixture including a first co-solvent and a second co-solvent, wherein the second co-solvent has plasticizing characteristics when interacting with a polymeric build material, the second co-solvent being selected from the group consisting of benzyl alcohol and diethylene glycol ether; and
 a balance of water.

2. The jettable fusing agent composition of claim 1, wherein the co-solvent mixture is present in an amount ranging from about 20 wt % to about 80 wt % of the total weight of the fusing agent composition, and the first co-solvent is selected from the group consisting of:

1-(2-Hydroxyethyl)-2-pyrrolidone (HE2P), 1,5-Pentanediol, 1,2-Hexanediol, 2-PyrrolidinoneTriethylene glycol, Tetraethylene glycol, 2-methyl-1,3-propanediol, 1,6-Hexanediol, Diethylene glycol butyl ether, 1,2-propanediol, and Tripropylene glycol methyl ether.

3. The jettable fusing agent composition of claim 1, wherein the radiation absorber is a visible-light absorbing colorant, the first co-solvent is to provide miscibility for the second co-solvent with the water, and the second co-solvent is to provide a reduction in a melting point of a build material when the fusing agent composition comes in contact therewith.

4. The jettable fusing agent composition of claim 1, wherein the radiation absorber is present in the amount ranging from about 0.01 wt % to about 0.75 wt % of the total weight of the fusing agent composition.

5. The jettable fusing agent composition of claim 1, further including a surfactant present in an amount ranging from about 0.5 wt % to about 1.0 wt % of the total weight of the fusing agent composition.

6. The jettable fusing agent composition of claim 1, wherein:

the first co-solvent is present in an amount ranging from 10 wt % to 50 wt % of the total weight of the fusing agent composition; and the second co-solvent is present in an amount ranging from 10 wt % to 35 wt % of the total weight of the fusing agent composition.

7. A kit, comprising a polymeric build material composition; and a jettable fusing agent composition including:

a radiation absorber present in an amount ranging from about 0.005 weight percent (wt %) to about 1.0 wt % of a total weight of the fusing agent composition, wherein the radiation absorber absorbs radiation at a wavelength range within the visible light spectrum;

a first co-solvent;

a second co-solvent, wherein the second co-solvent has plasticizing characteristics when interacting with the polymeric build material composition, the second co-solvent being selected from the group consisting of benzyl alcohol and diethylene glycol ether; and a balance of water;

wherein the radiation absorber is a visible-light absorbing colorant.

8. The kit of claim 7, wherein the polymeric build material composition comprises a polymeric build material filled with a whitener selected from the group consisting of zinc oxide and TiO$_2$.

9. The kit of claim 7, wherein the first co-solvent and second co-solvent together are in an amount ranging from about 20 wt % to about 80 wt % of the total weight of the fusing agent composition.

10. The kit of claim 7, wherein the visible-light absorbing colorant is selected from a pigment and a dye, and the radiation absorber is to absorb the radiation at the wavelength range and convert the radiation to thermal energy.

11. A method, comprising:

applying a polymeric build material composition to form a polymeric build material layer;

selectively applying a jettable fusing agent composition on a portion of the polymeric build material layer, the fusing agent composition including:

a radiation absorber present in an amount ranging from about 0.005 weight percent (wt %) to about 1.0 wt % of a total weight of the fusing agent composition, wherein the radiation absorber absorbs radiation at a first wavelength range within the visible light spectrum;

a co-solvent mixture present in an amount ranging from about 20 wt % to about 80 wt % of the total weight of the fusing agent composition, the co-solvent mixture including a first co-solvent and a second co-solvent, wherein the second co-solvent has plasticizing characteristics when interacting with the polymeric build material layer, the second co-solvent being selected from the group consisting of benzyl alcohol and diethylene glycol ether; and a balance of water;

wherein the radiation absorber is a visible-light absorbing colorant; and exposing the applied fusing agent composition and the portion of the build material layer to radiation at a second wavelength range within the visible light spectrum to fuse the portion of the build material layer and to form a white layer of a three-dimensional (3D) part;

wherein the method does not utilize a UV light source.

12. The method of claim 11, wherein exposing the applied fusing agent composition and portion of the build material layer to the radiation includes using a visible light-light source that emits the radiation of the second wavelength range which overlaps with the first wavelength range.

13. The method of claim 11, wherein the white layer is selected from a neutral white color and a near-neutral white color, and has coordinates of lightness (L*), red/green (a*), and yellow/blue (b*) in amounts ranging from:

about 80 L* to about 100 L*;

about −3 a* to about 3 a*; and about −5 b* to about 5 b*.

14. The method of claim 11, wherein in response to exposing the applied fusing agent composition to the radiation of the second wavelength range, the method comprises:

absorbing the radiation of the second wavelength range that overlaps with the first wavelength range and converting the radiation to thermal energy by the radiation absorber; and in response to the thermal energy, melting and fusing the polymeric build material layer, wherein a melting point of the polymeric build material composition is reduced by the second co-solvent.

15. The jettable fusing agent composition of claim 1, wherein the radiation absorber absorbs radiation at the wavelength range between about 380 nanometers (nm) and about 780 nm.

16. The kit of claim 7, wherein the radiation absorber absorbs radiation at the wavelength range between about 380 nanometers (nm) and about 780 nm.

17. The jettable fusing agent composition of claim 1, wherein the radiation absorber is devoid of a UV radiation absorber.

18. The jettable fusing agent composition of claim 1, wherein the radiation absorber is devoid of tungsten bronze.

19. The jettable fusing agent composition of claim 1, wherein the radiation absorber is a visible-light absorbing colorant selected from the group consisting of Direct Black (DB) 168, Acid Yellow (AY) 23, AY 17, Acid Red (AR) 52, AR 289, Reactive Red 180 (RR 180), Direct Blue (DB) 199, Pigment Blue (PB) 15:3, Pigment Red (PR) 122, Pigment Yellow (PY) 155, and PY 74.

* * * * *